United States Patent
Reuschel et al.

(10) Patent No.: US 6,622,075 B1
(45) Date of Patent: Sep. 16, 2003

(54) METHOD AND APPARATUS FOR REGULATING THE TRANSMISSION RATIO OF A CONTINUOUSLY VARIABLE TRANSMISSION

(75) Inventors: Michael Reuschel, Bühl (DE); Thomas Pfund, Leiberstung (DE); Thomas Endler, Bühlertal (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 68 days.

(21) Appl. No.: 09/630,697

(22) Filed: Aug. 1, 2000

(30) Foreign Application Priority Data

Aug. 2, 1999 (DE) .......................................... 199 36 316

(51) Int. Cl.⁷ .......................... G06F 17/00; F16H 59/06
(52) U.S. Cl. ........................................... 701/51; 477/37
(58) Field of Search ............................... 701/51, 53–54, 701/60–63, 87, 90; 477/7, 15, 17, 34, 43, 68, 44–46, 76, 97, 98, 110, 115, 156, 159–161, 174, 37, 48; 123/319, 349, 339.22, 339.24, 350, 363, 406.19, 406.36, 406.46, 406.5, 406.51, 406.52, 681–683

(56) References Cited

U.S. PATENT DOCUMENTS

| | | | | |
|---|---|---|---|---|
| 4,283,970 A | * | 8/1981 | Vukovich | 477/161 |
| 5,713,332 A | * | 2/1998 | Adler et al. | 123/406.19 |
| 6,063,004 A | * | 5/2000 | Ibamoto et al. | 477/47 |
| 6,086,507 A | * | 7/2000 | Luh | 477/48 |
| 6,183,390 B1 | * | 2/2001 | Koga et al. | 477/37 |
| 6,192,306 B1 | * | 2/2001 | Kidokoro et al. | 701/51 |
| 6,292,730 B1 | * | 9/2001 | Takizawa et al. | 701/51 |

FOREIGN PATENT DOCUMENTS

DE    195 46 294 A 1    6/1996

* cited by examiner

Primary Examiner—Thu Nguyen
(74) Attorney, Agent, or Firm—Alfred J. Mangels

(57) ABSTRACT

A method and apparatus for regulating the transmission ratio of a continuously variable transmission. A set point value for adjusting the transmission ratio can be changed as a function of the operating parameters of a power train that includes the transmission. The set point value is composed of an initial control value and a regulating value. The initial control value depends on at least two operating parameters of the transmission. The set point value is updated to take into account changes that occur during operation of the transmission.

7 Claims, 4 Drawing Sheets

METHOD AND APPARATUS FOR REGULATING THE TRANSMISSION RATIO OF A CONTINUOUSLY VARIABLE TRANSMISSION

BACKGROUND OF THE INVENTION

1. Field of the Invention

The present invention relates to a method and to apparatus for controlling the transmission ratio of a continuously variable transmission for a motor vehicle.

2. Description of the Related Art

One form of a continuously variable transmission is described in German Patent Publication No. DE 19 546 294 A1. A continuously variable transmission generally includes pairs of conical sheaves in the form of a pair of input sheaves and a pair of output sheaves. Each pair of sheaves includes an axially displaceable sheave and an axially stationary sheave to allow adjustment of the transmission ratio. Between the two pairs of sheaves is an endless, torque-transmitting member in the form of a drive belt for transmitting torque During the time of operation of such a transmission, changes caused by wear occur, or changes that, for example, are attributable to the transmission itself. Other changes generally occur in transmissions once test-stand-derived parameter settings are changed. As a result, and depending on the duration of operation of a transmission, on wear condition circumstances, and the like, different demands are imposed, and those conditions can adversely influence the regulation accuracy and the operational behavior of the transmission.

An object of the present invention is to provide a method and an apparatus for regulating the transmission ratio of a continuously variable transmission, especially such a transmission intended for use in a motor vehicle, and to provide high operational performance of the transmission over long operating times.

SUMMARY OF THE INVENTION

Briefly stated, in accordance with one aspect of the present invention, a method for regulating the transmission ratio of a continuously variable transmission is provided. The method includes changing a set point value for the transmission ratio of the transmission as a function of operating parameters of a power train. The set point value is composed of a preliminary control value and a correction value, and the correction value is derived by comparing a measured transmission ratio with the set point transmission ratio. The preliminary control value is a function of at least two transmission operating parameters, and the relationship between the transmission operating parameters and the transmission's set point value correction value is updated based upon changes that occur during transmission operation.

In accordance with another aspect of the present invention, apparatus is provided for regulating the transmission ratio of a continuously variable transmission. The apparatus includes sensors for detecting operational transmission parameters, and an electronic control unit including a microprocessor and at least one memory in which operating parameters associated with reference transmission ratios are stored. The electronic control unit further includes a preliminary control device in which a preliminary control value is determined as a function of at least one of the transmission operating parameters, and a regulator is provided for comparing a measured transmission ratio of the transmission with a reference transmission ratio and for deriving therefrom a control value. An adjusting device receives the preliminary control value and the regulation value as the set point value in order to adjust the transmission. The preliminary control value is stored in the preliminary control device as a function of at least two transmission operating parameters, and an adjustment system is provided which changes the preliminary control value so that the measured transmission ratio coincides with the reference transmission ratio when the control variable is at least approximately zero.

BRIEF DESCRIPTION OF THE DRAWINGS

The invention is further described below in connection with the enclosed drawings in which.

DESCRIPTION OF THE PREFERRED EMBODIMENTS

Figure 4:
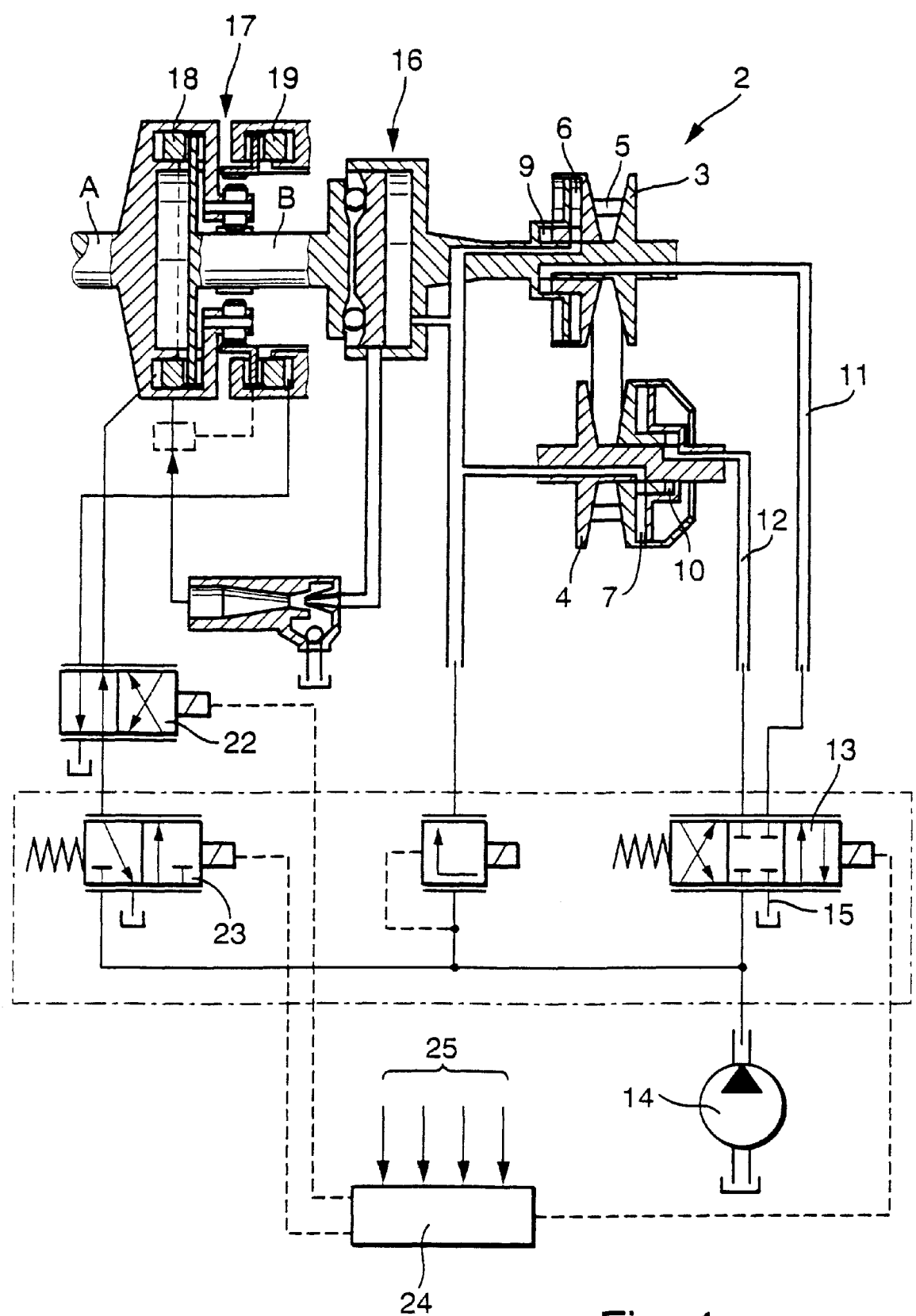
FIG. 4 is an embodiment of a continuously variable transmission that includes a control system in accordance with the present invention.

One form of a continuously variable transmission 2 is shown in FIG. 4. Such a continuously variable transmission 2 includes conical sheaves in the form of a pair of input sheaves 3 and a pair of output sheaves 4. Each pair of sheaves includes an axially displaceable sheave and an axially stationary sheave. Between the two pairs of sheaves an endless, torque-transmitting member in the form of a drive belt 5 is provided for transmitting torque The pair of input sheaves 3 and the pair of output sheaves 4 can be axially pressed against the belt by a respective piston/cylinder unit 6, 7. Further pairs of piston/cylinder units 9, 10 are provided parallel to piston/cylinder units 6 and 7, respectively, and serve to change the transmission ratio. A pressurized medium can alternately be filled and evacuated from the pressure chambers of the piston/cylinder units 9, 10 in relation to the required transmission ratio. For that purpose, and corresponding with demand requirements, conduits 11, 12 can be connected by a control valve 13 with a pump 14 constituting the source of a pressurized medium, or with a return line 15.

A torque sensor 16 is provided for producing a torque-dependent pressure in the piston/cylinder units 6 and 7, and it transmits at least part of the torque introduced by a drive shaft A driven by an engine, for instance the engine of a motor vehicle, and by an intermediate control clutch 17, to the input sheaves 3. Clutch 17 includes an input clutch 18 as well as, where called for, a rotation direction reversing device 19 for changing the direction of rotation of an intermediate shaft B.

Units 18 and 19 are operated hydraulically and can be actuated by a switchover valve 22 that is connected in series with a control valve 23. Valves 13, 22, and 23 are operated by a control unit 24, to the inlets 25 of which are supplied operating parameters of a motor vehicle, or of an engine, and/or of a transmission. The sensors needed to detect those operational parameters are not shown in FIG. 4.

The transmission ratio adjustment of transmission 2 is generally implemented by control unit 24 with the assistance of control valve 13 by combining an anticipatory control signal and a control setting. The anticipatory control signal generally takes into account, for example, the effective engine torque at the input drive shaft A. Depending on that torque, anticipatory control signal values that have been stored in a memory of control unit 24, and that correspond with those that drive control valve 13, provide a default transmission ratio. Control unit 24 further includes a regulating device, which in dependence on operating parameters compares stored set point values of the transmission ratio with the respective actual values, and from the comparison it produces a correction value that is added to the anticipatory control value and that causes the actual transmission ratio to correspond with the stored, set point transmission ratio.

Because the preliminary control value is determined and stored as a function of at least two transmission operational parameters, the quality of the preliminary control is improved, as a result of which the regulator can operate more rapidly and more accurately. Updating the preliminary control value compensates, i.e. matches for instance wear-caused changes in the transmission as well as adjustment to different transmissions. Both enhance the quality of regulation.

Figure 1:
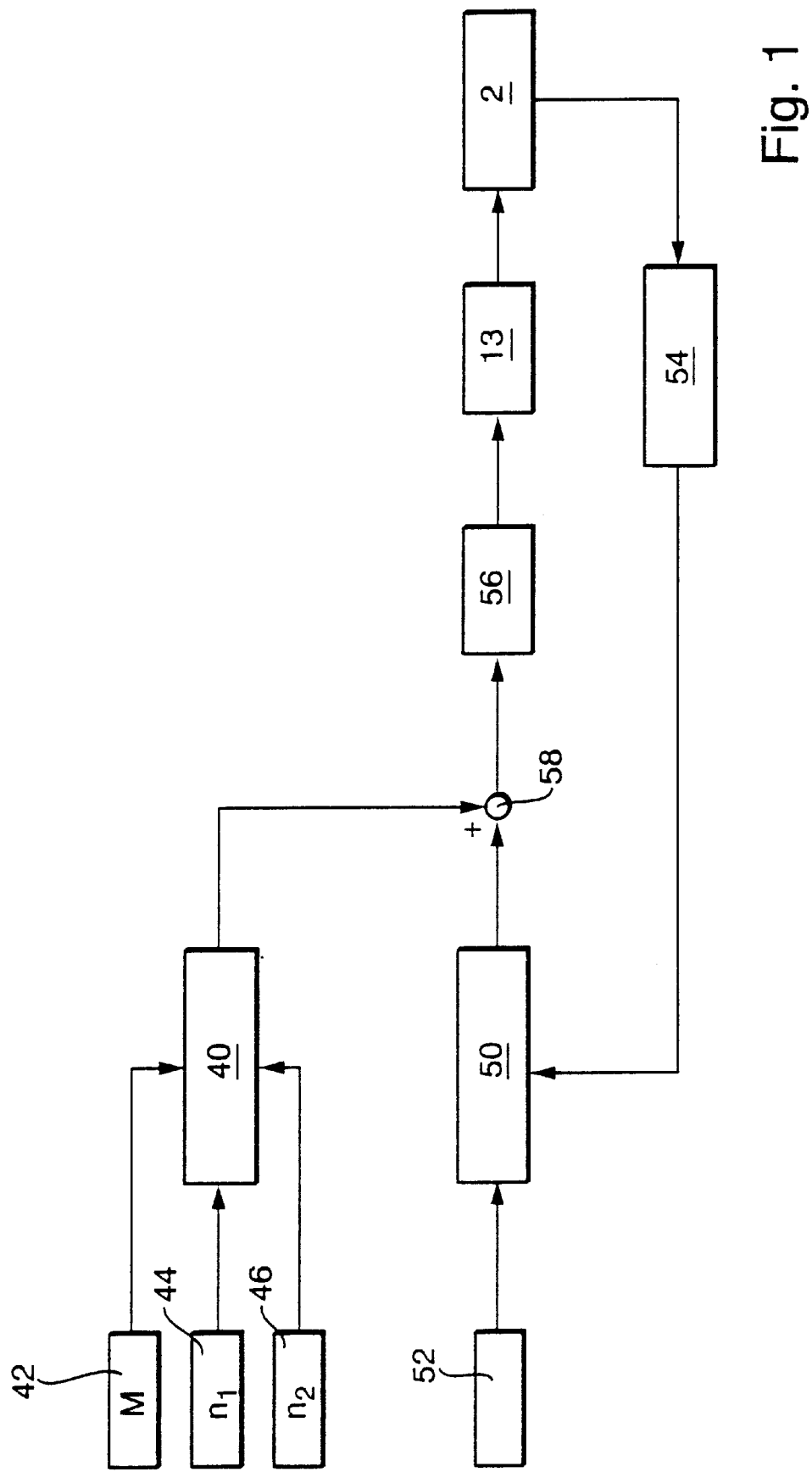
FIG. 1 is a block diagram showing a system in accordance with the present invention for the control and regulation of the transmission ratio of a transmission.

As shown in FIG. 1, a preliminary control device 40 is connected to a torque sensor 42 for detecting the effective drive torque applied to drive shaft A (shown in FIG. 4). A tachometer 44 is provided for detecting the angular speed $n_1$ of drive shaft A and a tachometer 46 is provided for detecting the angular speed $n_2$ of the output shaft (sheave-pair 4 of FIG. 4). Torque sensor 42 can receive a signal directly from torque sensor 16 shown in FIG. 4, or if, for instance, the transmission lacks a torque sensor or operates only with one pressure chamber per pair of sheaves, an individual torque sensor of a known design can be provided.

A regulating device 50 is connected with a set point transmitter 52 and with a measured-value sensor 54. Set point generator 52 contains stored reference values of transmission ratios that depend, for example, on transmission operating parameters, for example the engine torque and the output rotational speed. Measured-value sensor 54 detects the instantaneous transmission ratio of the transmission, for example by evaluating the signals; from speed sensors 44 and 46.

The transmission ratio of transmission 2 is modified by a control valve 13 (also shown in FIG. 4) that receives a control current from a current regulator 56. The output of preliminary control unit 40 is connected to one input of a summing junction 58, and the output of regulating device 50 is connected to a further input of summing junction 58, the output of which is applied to the input of current regulator 56 connected with control valve 13.

The described apparatus operates as follows:

Preliminary values that depend upon the engine torque, the transmission ratio of the transmission, and, for example, the rotational drive speed, are stored in preliminary control unit 40 in the form of a characteristic data field, or a performance graph, that can be determined, for example, on a test stand. The preliminary control values are selected in such a manner that the transmission ratio of transmission 2, when it is controlled only by the preliminary control values (the regulating device output signal=0), substantially corresponds to a characteristic field of set point values that are stored in set point transmitter 52 as a function of the operational parameters of the power train, for example the drive torque and the output rotational speed of the transmission. The better the physical transmission behavior is described by parametric equations, the smaller the quantity of support data needed for the preliminary control data field.

Because the operating behavior of the transmission changes with temperature as a result of wear, and the like, regulating device 50 is provided in addition to preliminary control device 40. Regulating device 50 compares the measured transmission ratio detected by measured-value sensor 54 with a set point transmission ratio provided by set point transmitter 52 and, depending on the regulation characteristic (proportional control, proportional-integral control, proportional-integral-derivative control, and the like) it produces a control value that is added at summing junction 58 to the preliminary control value that is delivered to the summing junction from preliminary control device 40, the sum so attained being an adjustment value conveyed to current regulator 56. Current regulator 56 conveys an "adjustment current," corresponding with the adjustment value conveyed to it, to control valve 13, where it is converted into a pressure differential for adjusting transmission 2 to the predetermined set point value stored in set point transmitter 52.

Of course, various operating parameters can be stored in preliminary control device 40 to provide the preliminary control data field, for example the engine torque and the transmission ratio, or the engine torque and the engine rotational speed, and the like. Moreover, more than two operating parameters can be considered, for example, and additionally, temperature and the like.

Assume, for example, that the preliminary control data field includes the following field data shown in Table 1, where T denotes the engine torque, R the transmission ratio, and 2 and 4 represent the closest points in the data field. The current values given in the table are the preliminary control values.

TABLE 1

| T/R | 2 | 4 |
|---|---|---|
| 0 | 400 mA | 450 mA |
| 100 | 300 mA | 350 mA |

Let a vehicle equipped with the apparatus be at a load condition of, for example, T=60 Nm and R=3.

Using suitable software for interpolation, the table provides for that load point a preliminary control current of 365 mA.

Assume, now, that the actual control current fed by current regulator 56 to control valve 13 is 350 mA. If the above conditions relate to a quasi-stationary operating condition of the vehicle, then it appears the operational behavior of the transmission or of the entire power train, has changed relative to the initial determination from the preliminary control data field that is based upon the test stand data, because the control current emanating from regulating device 50 is too high by 15 mA. The preliminary control data field stored in preliminary control device 40, can be adapted by appropriate software so that at that load point the set point transmission ratio arises directly from the preliminary control value without the generation by regulating device 50 of an additional control value.

The adapted, that is the corrected, data field, at which the set point transmission ratio is set solely by preliminary control is given in Table 2:

TABLE 2

| T/R | 2 | 4 |
|---|---|---|
| 0 | 385 mA | 435 mA |
| 100 | 285 mA | 335 mA |

In this manner the preliminary control data field can be adjusted to changes arising in the course of operation, for example as a result of wear or other influences, as a result of which the quality of the preliminary control is preserved and the adjusted control quality is improved.

Figure 2:
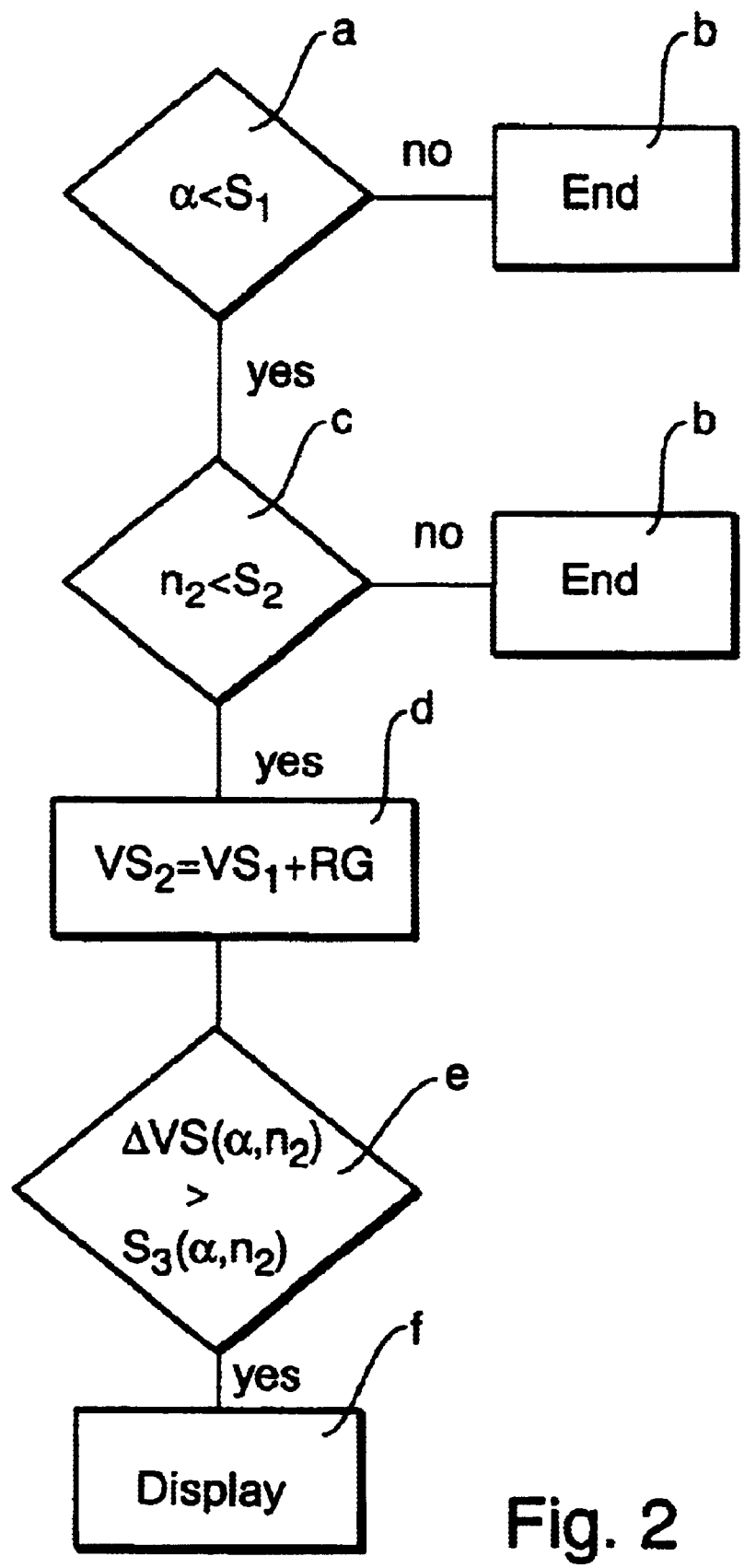
FIG. 2 is a flow chart showing an adjustment routine.

FIG. 2 shows a flow chart of a simple adjustment routine.

Programming step a checks whether the position α of a load-setting member, for example a throttle valve, changes less in time than would correspond to a predetermined threshold value S1. If that is not the case, the adjustment routine terminates in step b. If that is the case, the load-setting member's position is considered to be substantially stationary, and the program jumps to step c to check whether the output rotational speed $n_2$ varies less in time than a corresponding predetermined threshold value $S_2$. If that is not the case, a non-stationary state is ascertained and the correction routine ends (step b). If, however, the operational state is quasi-stationary, in step d the preliminary control value $VS_1$ stored in preliminary control unit 40 is changed by the amount of the correction value (R9), so that a hew value $VS_2$ is stored as the new preliminary control value, which corresponds with the presently-required adjustment value, to adjust a predetermined set point transmission ratio. In step e the change $\Delta VS$ of the preliminary control value is examined to determine if it is above a threshold value $S_3$, which, for example, is stored in a data field as a function of the position a of a load setting member and of the output rotational speed $n_2$. If that is the case, the transmission's operational state is considered as critical, and a display follows in step (f). In this manner the transmission, or the power train, is monitored.

The correction described above preferably is carried out from time to time in stationary or near-stationary operational states of the transmission or the power train. Of course, given appropriate mathematical models of the power train, a correction also can be carried out in non-stationary operational states.

Figure 3:
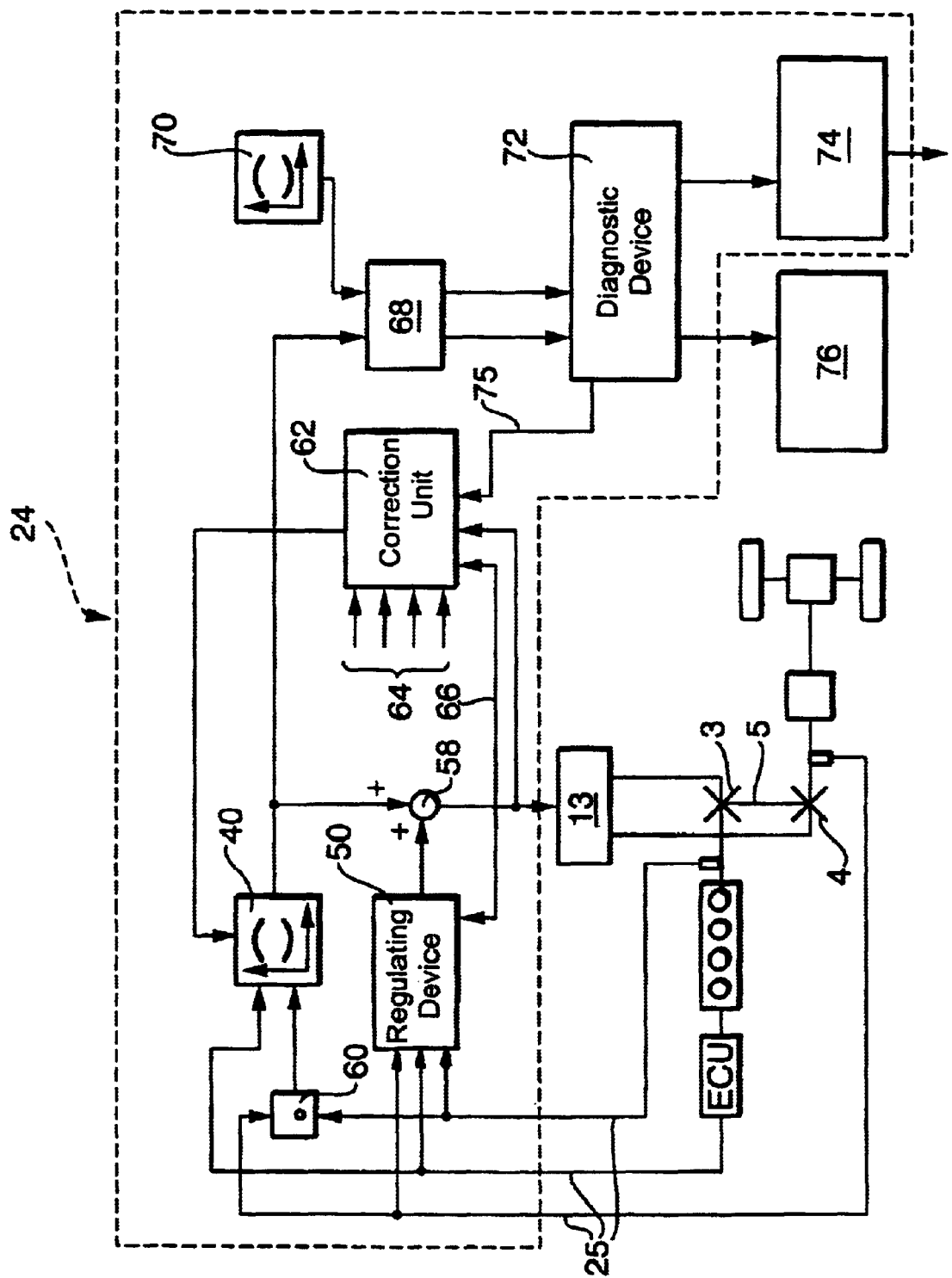
FIG. 3 is a block diagram of a modified embodiment of the system shown in FIG. 1.

FIG. 3 shows a block control diagram of a further embodiment of an arrangement in accordance with FIG. 1, wherein the same reference numerals are utilized for operationally equivalent elements to those shown in FIG. 1. Control unit 24 is indicated by a dashed line and includes the following functional blocks:

- a divider 60 for calculating the transmission ratio from the transmission's input rotational speed and output rotational speed that are applied to respective ones of inputs 25;
- the preliminary control unit 40 that includes a characteristic field of preliminary control data values, which are stored as a function of the transmission ratio, and at a further input the engine torque, and from the output of which a preliminary control value is conveyed to summing junction 58;
- the regulating device 50, which provides to summing junction 58 a value based upon the difference between the measured transmission ratio and a set point transmission ratio, as well as, where called for, additional, torque-influenced correction values;
- a correction device 62 with inputs 64 which, for example, can include the transmission's input and output rotational speeds, the engine-delivered torque, and the time; a conduit 66 connects correction device 62 to regulating device 50;
- a monitoring device including a comparator 68, a preliminary control value reference memory 70, a diagnostic device 72, and a diagnostic memory 74, wherein diagnostic device 72 is connected by a conduit 75 to correction device 62.

Not shown is a microprocessor for controlling the operation of the individual components of electronic control unit 24. In addition, a driver information system 76 is also provided.

The operation of the described arrangement concerning the adjustment or the control of the transmission ratio, with the combination of preliminary control unit 40 and regulating device 50, is as described above.

Correction unit 62 is provided for the already-described correction of the preliminary control data field, in which over the lifetime of the transmission, with the aid of actual output values from regulating device 50, as well as from drive train operating parameters, especially the engine, the respective changes are stored in the preliminary control unit and there the effective preliminary control data field is adjusted for changes that appear during the lifetime of the apparatus, for example changes caused by age or wear or environmental conditions are accommodated. Correction unit 62 includes stored correction algorithms, with associated parameters that determine when and how the preliminary control data field is updated, that is, to accommodate changes that arise during the process of operation. Good regulation quality is ensured by constantly updating the preliminary control data field.

With the aid of comparator 68, the actual, instantaneous preliminary control data field that is in effect in the preliminary control unit is compared with a reference preliminary control data field that is established, for example, when initially starting the transmission. The result of the comparison is conveyed to diagnostic device 72, in which are executed the algorithms or programs and parameters to check whether in the course of correcting the preliminary control data field, for example, values such as predetermined limit values were exceeded, and if so then the excess over the limit value is stored, for example, in diagnostic device 74, and/or display 76 is activated. Moreover, the transmission functions can be changed; for example a given set point transmission ratio will no longer serve to regulate if unwanted wear has been found in certain areas of the sheaves, or if slippage is discovered the torque-dependent sheave pressure on the endless, torque-transmitting member is changed. For those reasons the diagnostic device is connected by conduit 75 with correction device 62.

The functioning of the described apparatus can be implemented in a number of ways:

Illustratively, the change in the transmission ratio can be detected as a function of the changes in the set point values and can be compared with previously-stored limit values, whereby changes in the relationship can be diagnosed. The exceeding of predetermined limit values can be evaluated and displayed at any given time as wear limits, provided no other faults are diagnosed, for instance faults in the torque-dependent basic pressure on the sheaves.

The changes in the preliminary control data field can be,monitored as a function of the operating time of the transmission, or as a function of the operational performance. If the rate of change exceeds predetermined values, then it can be utilized to assess the transmission's wear limits.

As a result of wear, critical operating radii of the endless, torque-transmitting member can be detected and accordingly can be avoided. In that manner fluctuations in adjustment, premature failures, and substantial loss in personal comfort can also be avoided.

The following can be used as diagnostic criteria:

the absolute magnitude of the preliminary control values as a function of the transmission ratio and/or the torque and/or the rotational speed, to provide a predetermined limit-value data field, determining one or more change indices. The changes at discrete data field points are analyzed and one or more change indices are assembled. From a comparison with one or more limit values one can derive measurements.

if the rate of wear generally increases rapidly past a certain wear condition because hardened layers are destroyed. By observing the rate of change such critical conditions can be ascertained.

when, depending on a given, desired transmission ratio, the endless, torque-transmitting member is to be maintained at a given operating radius, at which the surface is damaged or worn, a clearly changed buildup behavior is presented relative to the wear-free condition. Thereby not only the general wear condition can be ascertained, but it also allows accurately locating the particular wear.

The diagnostic results each can be made available at once by means of display 76 and/or be stored in diagnostic memory 74, so that they remain available through appropriate interfaces for further processing, for instance maintenance, repairs, and/or quality control.

It is to be understood that the described apparatus can be altered in many ways both regarding the algorithms for adjustments and also as regards diagnosis or monitoring. The individual functional blocks can be mutually separate hardware elements; or they can be implemented on a more or less expansive scale in the form of software.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations, and/or materials, which, for example, are inventive by combining or modifying single features that are in combination and are described individually in relation to the general specification and embodiments, as well as the claims, and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A method for regulating the transmission ratio of a continuously variable transmission for motor vehicles, to take into account changes in transmission operation over time, including changes caused by wear of transmission parts, said method comprising the steps of:

a. providing a preliminary transmission ratio control value as a function of at least two transmission operating parameters;

b. providing a set point transmission ratio value for the transmission as a function of operating parameters of a power train, wherein the set point value is composed of the preliminary transmission ratio control value and a correction value;

c. deriving the correction value by comparing a measured transmission ratio with the set point transmission ratio value of said transmission; and d. adjusting the preliminary transmission ratio control value as a function of at least two transmission operating parameters based upon the correction value, to account for changes that occur during transmission operation over time.

2. A method in accordance with claim 1, wherein the at least two transmission operating parameters include the drive torque and the transmission ratio of the transmission.

3. A method in accordance with claim 1, wherein the preliminary control value is a function of a transmission rotational speed.

4. A method in accordance with claim 1, including the step of detecting the rate of change of the set point value.

5. A method in accordance with claim 1, including the step of generating a display when a change in the preliminary control value exceeds a predetermined limit value.

6. A method in accordance with claim 1, including the steps of:

a. providing preliminary transmission ratio control values as a characteristic control data field as a function of transmission operating parameters;

b. adjusting characteristic control data field values as a function of changes arising over time as a result of operation of the transmission.

7. A method in accordance with claim 1, including the step of detecting changes in transmission behavior when there are changes in the set point value.

* * * * *